US009927295B2

(12) United States Patent
Yoo et al.

(10) Patent No.: US 9,927,295 B2
(45) Date of Patent: Mar. 27, 2018

(54) DETECTION CIRCUIT AND METHOD TO MITIGATE 1/F NOISE IN SINGLE DETECTORS AND IN IMAGE SENSORS

(71) Applicants: Sung-Shik Yoo, Palatine, IL (US); Christopher L. Kauffman, Lake Zurich, IL (US); Phillip R. Minarik, Schaumburg, IL (US)

(72) Inventors: Sung-Shik Yoo, Palatine, IL (US); Christopher L. Kauffman, Lake Zurich, IL (US); Phillip R. Minarik, Schaumburg, IL (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 205 days.

(21) Appl. No.: 14/843,492

(22) Filed: Sep. 2, 2015

(65) Prior Publication Data
US 2017/0064224 A1    Mar. 2, 2017

(51) Int. Cl.
*G01J 1/46* (2006.01)
*G01J 1/44* (2006.01)

(52) U.S. Cl.
CPC .. *G01J 1/46* (2013.01); *G01J 1/44* (2013.01)

(58) Field of Classification Search
CPC .............................. G01J 5/28; G01J 2005/283
See application file for complete search history.

(56) References Cited

U.S. PATENT DOCUMENTS

| | | | |
|---|---|---|---|
| 6,380,530 B1 | 4/2002 | Afghahi | |
| 7,173,230 B2 | 2/2007 | Charbon | |
| 8,115,152 B1 * | 2/2012 | Martin | H03F 3/08 250/208.1 |
| 2009/0273386 A1 | 11/2009 | Korobeynikov et al. | |

* cited by examiner

*Primary Examiner* — Tony Ko
(74) *Attorney, Agent, or Firm* — Tarolli, Sundheim, Covell & Tummino LLP (57) ABSTRACT

A circuit includes an input capacitor that stores charge based on a current received from a photodetector during a bias phase of the photodetector. The stored charge on the input capacitor is sampled during the sampling phase to determine an amount of light captured by the photodetector. A bias controller supplies a pulsed-bias voltage to the photodetector to generate the current from the photodetector. The bias controller controls the current to a current level below a predetermined current threshold via the pulsed-bias voltage before biasing of the detector and subsequent sampling of the stored charge on the input capacitor is initiated to mitigate 1/F noise in the photodetector.

20 Claims, 5 Drawing Sheets

DETECTION CIRCUIT AND METHOD TO MITIGATE 1/F NOISE IN SINGLE DETECTORS AND IN IMAGE SENSORS

TECHNICAL FIELD

This disclosure relates to detectors and arrays of detectors that comprise image sensors, and more particularly to a circuit and method to mitigate 1/F noise when detecting signal from a single detector or from a sensor array.

BACKGROUND

Focal plane arrays (FPAs) are an array of detectors that are biased in parallel from an external voltage supply to generate electric field within a photosensitive area of a pixel, where photogenerated charges are drifted by the applied electric field, and signal is obtained by collecting the drifted charges at an electrode. Typically, photoconductive detectors made of polycrystals or nanocrystals suffer from 1/F noise caused by crystalline defects present at or near the interface between polycrystal or nanocrystal grains. In non-single crystalline detector material, these defects contribute greatly to photosensitivity as well as the source of 1/F noise (or low frequency noise). Generally, 1/F noise results from a wide range of carrier drift velocities or time constants of carriers in these defective materials.

One conventional type circuit operates with a DC voltage level supplied to a voltage divider circuit with the detector resistance connected in series with a load resistance that allows signal to be extracted when the detector resistance changes, but given there is a constant DC current flowing in the detector, it does not suppress low frequency noise. This is the most common biasing scheme. An alternate method is to use the DC signal from the detectors into double correlated sampling circuits that requires optical chopping to generate the reference from which the signal can be subtracted. The limitations of this method are that an optical chopper is required and that the low frequency noise is suppressed up to ½ the chopping frequency, but noise above this frequency is not suppressed and may actually be amplified which limits the noise reduction in this method if the detector knee frequency is above one half the chopping frequency Another method involves electrically modulating the detector to suppress the low frequency noise by a sine, triangle, or square wave pulse by lowering the average current passing through the detector. This method has the advantage of not requiring an optical chopper, but only suppresses the low frequency noise to a degree such that increased peak-to-peak bias results in increased responsivity and noise for only a modest gain in the signal-to-noise ratio (SNR). However, by reducing the total current during bias, low frequency is further reduced. In yet another method, the voltage across the detector is clamped to a high level voltage, then a switch is thrown that allows the bias across the detector to be discharged across a capacitor where the resulting RC discharge voltage is sampled. As light on the detector changes however, the resistance changes and the resulting RC decay changes. In this method, there is still some current flowing through the detector which can still lead to 1/F noise.

SUMMARY

This disclosure relates to a circuit and method to mitigate 1/F noise when detecting signal from a single sensor or a sensor array. In one aspect, the detector interface circuit includes an input capacitor that stores charge based on a current received from a photodetector during the bias phase on the photodetector. The stored charge on the input capacitor is sampled during or after the bias phase to determine an amount of light captured by the photodetector induced by changes in photodetector resistance. A bias controller supplies a pulsed-bias voltage to the photodetector to generate the current from the photodetector. The bias controller controls the current to a current level below a predetermined current threshold via the pulsed-bias voltage before the photodetector is biased and a subsequent sampling of the stored charge on the input capacitor is initiated to mitigate 1/F noise in the photodetector.

In another aspect, a circuit includes an input capacitor that stores charge based on a current received from a photodetector during the bias phase of the photodetector. The stored charge on the input capacitor is sampled during or after the bias phase to determine an amount of light captured by the photodetector. A bias controller supplies a pulsed-bias voltage to the photodetector to generate current from the photodetector. The bias controller controls the current to a current level below a predetermined current threshold at a predetermined time before biasing the detector via the pulsed-bias voltage before a subsequent sampling of the stored charge on the input capacitor is initiated to mitigate 1/F noise in the photodetector. A timing control in the bias controller controls timing of the subsequent sampling of the input capacitor such that the current level is below the predetermined threshold.

In yet another aspect, a method includes storing a charge based on a current received from a photodetector during a bias phase of the photodetector. The method includes generating a pulsed-bias voltage to the photodetector to generate the current from the photodetector. The method includes controlling the current to a current level below a predetermined current threshold via the pulsed-bias voltage before the photodetector is biased and a subsequent sampling of the stored charge on the input capacitor is initiated to mitigate 1/F noise in the photodetector. The method includes sampling the charge during or after the bias phase of the photodetector to determine an amount of light captured by the photodetector.

DETAILED DESCRIPTION

This disclosure relates to a circuit and method to mitigate low frequency noise when detecting signal from a photoconductive detector. The low frequency noise has a noise power that is the inverse of the frequency, and it is referred to as "1/F Noise' or "Flicker Noise" and is a common characteristic of many electrical components. The 1/F Noise is generated by defects that are called electrical "traps" within or on the surface of an electrically conductive material such as a polycrystalline photodetector, for example. In the polycrystalline detector, the active area is employed to absorb light (photons) and generate corresponding photo-generated charge carriers. To extract signal from the detector, a circuit is employed that includes the detector element and a load element. The circuit includes a bias controller for biasing the active area of the photodetector in series with the load element. The bias controller can be configured to generate pulsed voltage signals with short duty cycles (e.g., a 3% duty cycle) and apply the pulsed voltage signals to the active area. This causes an electrical field to be generated within the active area causing the photo-generated charge carriers to drift and generate a representative current signal.

The circuit can utilize a load capacitor which in a resistor-capacitor (RC) circuit configured to receive the representative current signal from the active area of the photodetector and generate a related voltage signal across the capacitor in the RC circuit where the photodetector is modeled as the resistor. A sample and readout circuit can be configured to monitor (sample) the related voltage signal across the input capacitor as it charges or discharges. Applying a respective pulsed voltage signal with a short duty cycle to the active area, the representative current signal passing through the RC circuit during active cycles of the respective pulsed voltage signal has reduced 1/F noise since the 1/F noise has a relatively lower frequency than the representative current signal. Consequently, a related voltage signal is generated across the input capacitor with reduced 1/F noise which can be sampled during cycles of the respective pulsed voltage signal by the sample and readout circuits. Signal pulsing and timing can be controlled such that the voltage signal across the input capacitor is controlled to a current level below a predetermined threshold which can be controlled by timing (e.g., waiting for the signal to go below the threshold) and/or active discharge of the voltage signal below the threshold before detecting signal from the detector in subsequent samples. This threshold level is related to the amount of average current during the time period between pulses and, in principle, the lower the threshold level the lower the 1/F noise. This relation may vary for each type of detector.

The sample and readout circuit can be configured to measure (timely sample) the related voltage during a particular time frame (a sampling range) of a transient response of the input capacitor as it discharges to generate a representative voltage signal. The representative voltage signal corresponds to the photo-generated charge carriers with reduced 1/F noise. The time frame to sample the related voltage can be calculated based on parameters (e.g., resistance, capacitance) of the RC circuit and/or can also be based on the lifetime of the photodetector. Sampling the related voltage signal within the sampling range evades (suppresses) the 1/F noise before it can build and thus have degrading effects on the related voltage signal.

Figure 1:
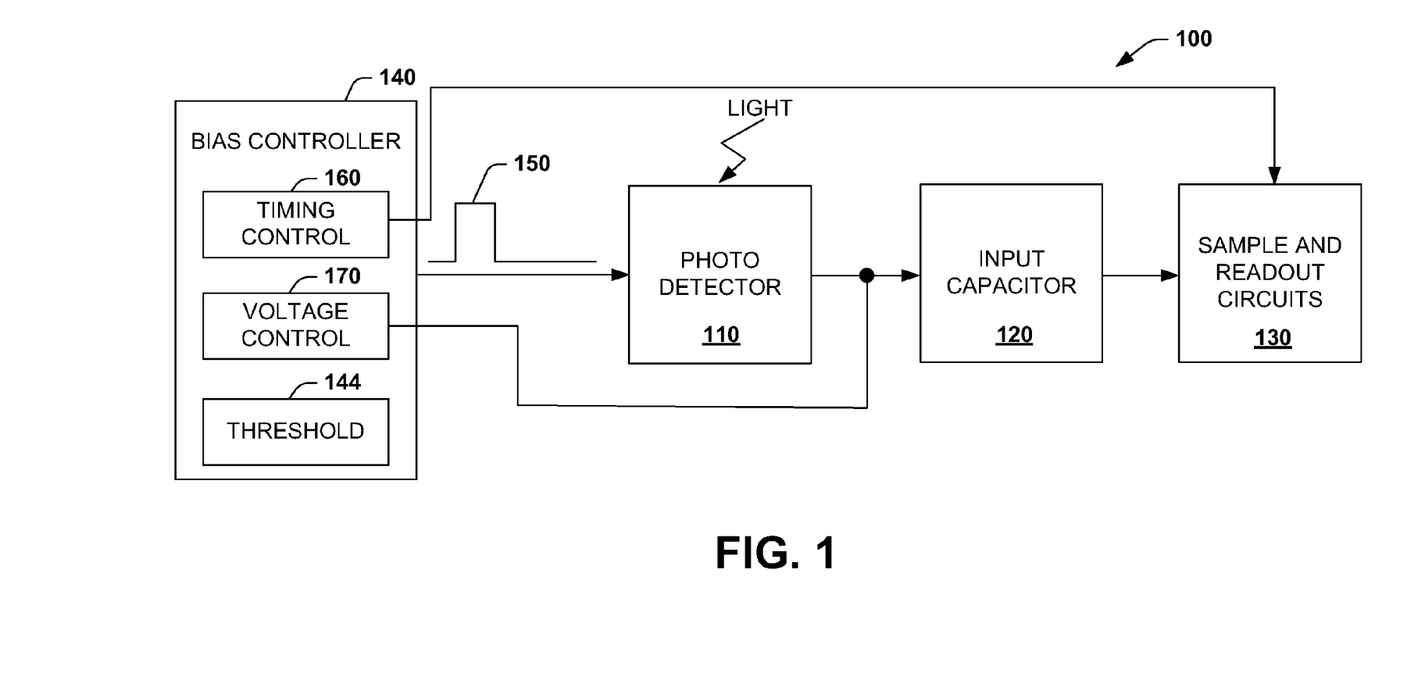
FIG. 1 illustrates an example of a circuit to mitigate 1/F noise during readout of a photodetector.

FIG. 1 illustrates an example of a circuit 100 to mitigate 1/F noise during readout of a photodetector 110 (also referred to as detector). An input capacitor 120 stores charge based on a current received from the photodetector 110 during a bias phase of the photodetector. The stored charge on the input capacitor 120 is sampled by a sample and readout circuit 130 during or after the bias phase to determine an amount of light captured by the photodetector 110 and induced by changes in photodetector resistance. A bias controller 140 supplies a pulsed-bias voltage 150 to the photodetector 110 to generate the current from the photodetector. The bias controller 140 controls the current from the photodetector 110 to a current level below a predetermined current threshold 144 via the pulsed-bias voltage 150 before the photodetector 110 is biased and a subsequent sampling of the stored charge on the input capacitor 120 is initiated to mitigate 1/F noise in the photodetector. For example, the bias controller 140 can control the pulse width and frequency of the pulse-bias voltage 150 to control when to reenergize the photodetector 110 for a subsequent readout. This includes signaling to the sample and readout circuit 130 when to convert a given sample (e.g., previous sample) from the input capacitor 120 to a light intensity value for the photodetector 110. The bias controller 140 can wait (e.g., delay) until current in the detector is below the predetermined current threshold 144 before generating another pulsed-bias voltage 150, in one example. This delay can be influenced by the material properties of the detector 110, the maximum and/or minimum amount of light received by the detector which affects the resistance of the detector, the capacitance of the input capacitor 120 (e.g., can be a variable capacitor), temperature considerations, and so forth.

As shown, a timing control 160 in the bias controller 140 can control timing of the subsequent sampling of the input capacitor 120 via the sample and readout circuit 130 such that the current level in the detector 110 is held below the predetermined threshold 144 prior to biasing (e.g., detector current near zero before re-pulsing the detector). In one specific example, the timing control 160 controls the timing of the photodetector bias and subsequent sampling of the input capacitor 120 such that the subsequent sampling is greater than a time parameter related to a lifetime of the photodetector 110. As used herein, the term lifetime refers to minority junction carriers that flow in the detector 110 and generally dissipate after excitation according to a natural logarithm (e) e.g., 1/e dissipation.

In another example, the time parameter can be set to about ten percent of the lifetime of the photodetector 110. In a more narrow range, wherein the time parameter is set such that the current level from the photodetector drops below a threshold value at a predetermined time before the biasing of the photodetector and subsequent sampling of the stored charge on the input capacitor is initiated.

Rather than delaying to wait for detector current to approach zero to mitigate 1/F noise, the bias controller 140 can also include a voltage control 170 which can discharge the input capacitor and detector 110 to a current value below the threshold 144. The voltage control 170 discharges the photodetector 110 and the input capacitor to a current level below the predetermined current threshold 144 before the subsequent sampling of the stored charge on the input capacitor 120 is initiated. It is noted that the detector 110 can include an array of detectors (e.g., focal plane array), where each detector in the array communicates with a bias controller, input capacitor, and sample and readout circuit as described herein. Each detector 110 in the array can be configured to receive light at substantially any wavelength (e.g., infrared, visible, ultraviolet) depending on the configuration and material selection of the detector.

An aspect to reducing low frequency detector 1/F noise electrically is to alternate between a high bias condition for maximum responsivity, and a period in time just prior to this, on the order of the detector material lifetime, where there is no current flowing through the detector 110 and where it is resting in a substantially steady state. The extent to which the detector 110 is off and in a resting unbiased steady state before the pulse-bias voltage 150 is applied by the bias controller 140 affects the amount of noise suppression—the lower the current in the detector before the next pulse, the lower the noise. Even with less than 20 mV of DC bias on the detector 110, for example, a degenerate polycrystalline detector produces 1/F noise. Residual voltage on the detector between pulses 150 can allow 1/F noise to be generated in the detector as well. Detector 1/F noise, even a small amount, can manifest itself as a slow random drift in the resistance of the detector 110 that can result in the pixel value drifting over time. This can cause spatial noise to increase over time in a 2D mosaic array of detectors, for example.

A large amount of 1/F noise causes the detector 110 to operate like it is blinking from a high to low level temporally in a random manner. The bias waveform 150, timing control 160, and/or voltage control of the bias controller 140 mitigates the low frequency 1/F noise by controlling pulsing and sampling of the detector 110 at very low current levels in the detector. The detector current should be controlled to a low level for a time period in a proportion to the detector lifetime, for example, before the detector is biased and signal level is sampled. With the detector current controlled to a very low level for the specified time period and/or via voltage control for discharge of current, the detector 110 assumes the low frequency noise at this low level DC current. Then, turning on the bias and sampling via a short pulse 150 does not allow the low frequency noise to build up. The overall detector current is low based on the pulse-biasing described herein which also minimizes power dissipation in the detector 110.

Figure 2:
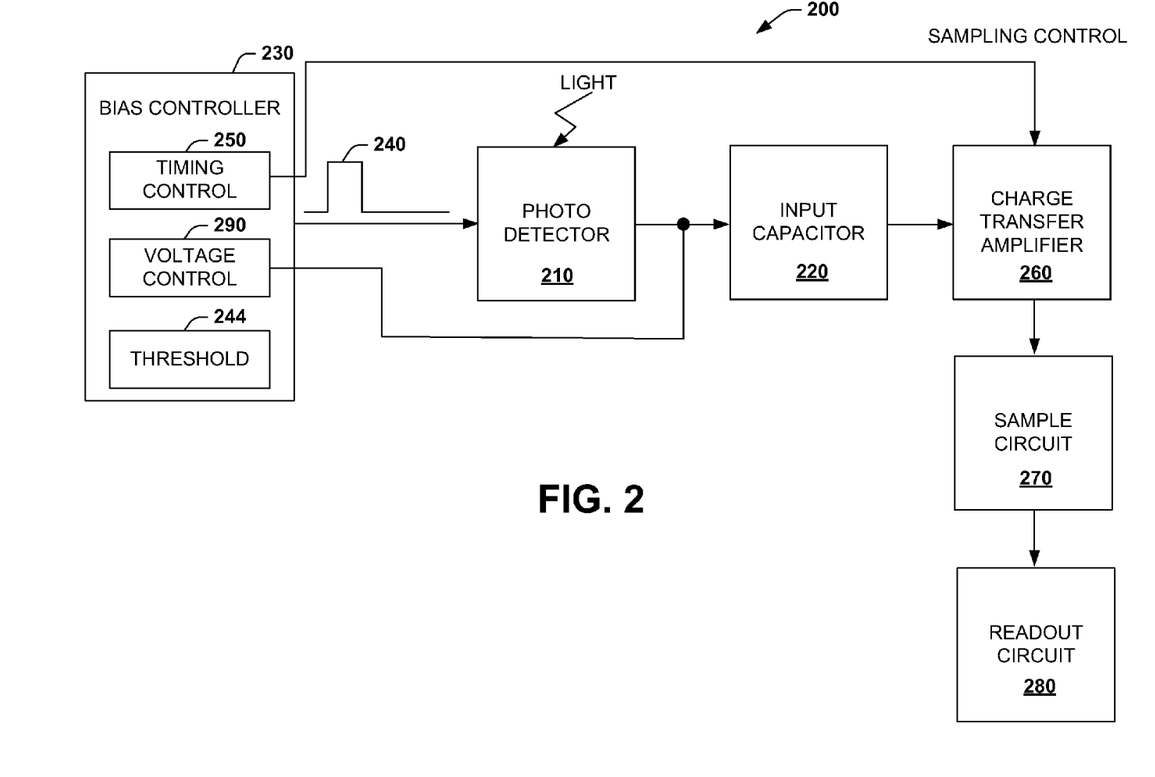
FIG. 2 illustrates an alternative example of a circuit to mitigate 1/F noise during readout of a photodetector.

FIG. 2 illustrates an alternative example of a circuit 200 to mitigate 1/F noise during readout of a photodetector 210. In this example, other aspects of the sample and readout circuit described above are provided. The circuit 200 includes an input capacitor 220 that stores charge based on a current received from the photodetector 210 during a bias phase of the photodetector. The stored charge on the input capacitor 220 is sampled during the bias phase to determine an amount of light captured by the photodetector 210. A bias controller 230 supplies a pulsed-bias voltage 240 to the photodetector 210 to generate the current from the photodetector. The bias controller 230 controls the current to a current level below a predetermined current threshold 244 via the pulsed-bias voltage 240 before a subsequent sampling of the stored charge on the input capacitor 220 is initiated to mitigate 1/F noise in the photodetector 210. A timing control 250 in the bias controller 230 controls timing of the subsequent sampling of the input capacitor 220 such that the current level is below the predetermined threshold 244.

As noted previously, the timing control 250 can control the timing of the subsequent sampling of the input capacitor 220 such that the subsequent sampling is greater than a time parameter for a lifetime of the photodetector 210. The time parameter can be set to about ten percent of the lifetime of the photodetector in one example. In another example, the time parameter is set such that the current level from the photodetector 210 drops below a threshold value at a predetermined time before the biasing of the photodetector and subsequent sampling of the stored charge on the input capacitor is initiated. As shown, the timing control 250 includes a sampling control output to control timing of the subsequent sampling of the stored charge on the input capacitor. In this example, a charge transfer amplifier 260 receives the stored charge from the input capacitor 220 based on the sampling control output.

The charge transfer amplifier 260 amplifies the sampled voltage that is related to the charge on the input capacitor 220 and is a function of light incident on the photodetector.

A sample circuit 270 (e.g., sample and hold) sampled the stored charge from the charge transfer amplifier 270 as a sampled charge during or after the bias phase of the photodetector 210. A readout circuit 280 (e.g., A/D converter) converts the sampled voltage to a value representing the light intensity of the photodetector 220 from the previous sample. A voltage control 290 in the bias controller 230 can also be provided to discharge the photodetector 210 and the input capacitor 220 to a current level below the predetermined current threshold 244 at a predetermined time before the subsequent sampling of the stored charge on the input capacitor is initiated. For example, the voltage control 290 can be an electronic switch that is activated to perform the discharge.

Figure 3:
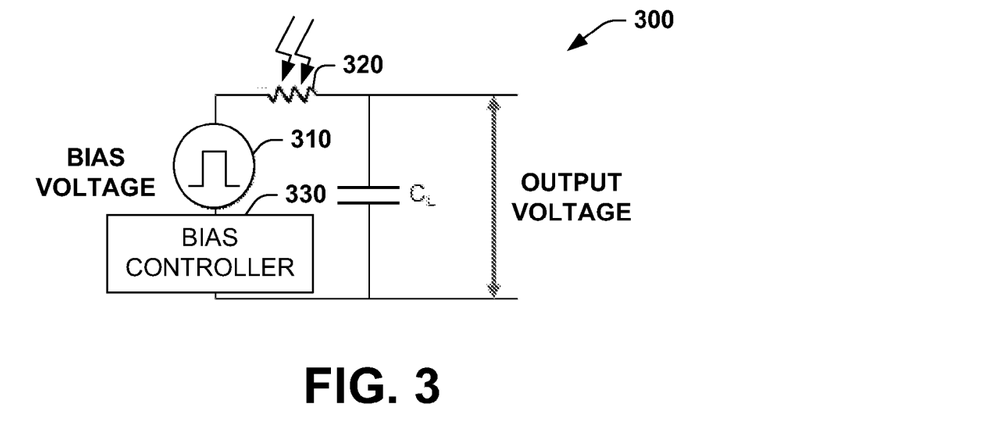
FIG. 3 illustrates an example pulse bias circuit for a photodetector.

FIG. 3 illustrates an example pulse bias circuit 300 to mitigate 1/F noise for a photodetector. In this example, a pulse-bias voltage 310 is applied to a photoconductor 320 which is a resistive model that describes the photodetectors described herein. The pulse-bias voltage 310 is applied via bias controller 330, where output from the photoconductor 320 is stored on input capacitor CL where an output voltage is stored for subsequent sampling to determine the intensity of light captured by the photoconductor 320. As noted previously, a given detector array can include a plurality of photoconductor elements 320. As noted above with respect to FIG. 1, the bias controller 330 can wait (e.g., delay) until current in the detector 320 is below a predetermined current threshold before generating another pulsed-bias voltage 310, in one example. This delay can be influenced by the material properties of the detector 320, the maximum and/or minimum amount of light received by the detector which affects the resistance of the detector, the capacitance of the input capacitor CL (e.g., can be a variable capacitor), temperature considerations, and so forth. Although, not shown, the bias controller 330 can also include a voltage control to discharge current from the detector 320 and capacitor CL before a subsequent pulse is applied to the detector.

Figure 4:
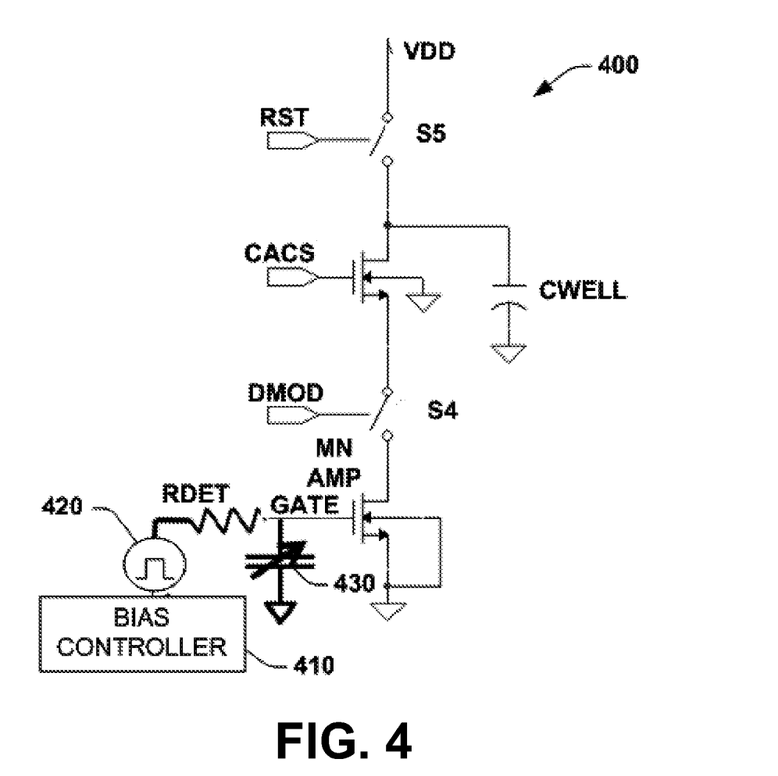
FIG. 4 illustrates an example pulse bias circuit and charge transfer amplifier for reading a photodetector.

FIG. 4 illustrates an example pulse bias circuit 400 to mitigate 1/F noise for a photodetector and a charge transfer amplifier for reading a photodetector. The circuit 400 includes a bias controller 410 that generates a pulsed-bias voltage to a photoconductor shown as Rdet. The bias controller 410 can operate such as previously described with respect to FIGS. 1 and 2. Output from Rdet is stored on a variable capacitor 430 operating as the input capacitor which supplies its charge to subsequent sampling circuits via charge transfer amplifier MN_AMP and according to a sampling control signal DMOD that controls switch S4. The charge transfer amplifier MN_AMP is similar to the charge transfer amplifier described above with respect to FIG. 2, where the sampling control signal can be generated by a timing control in the bias controller 410. Output from the charge transfer amplifier MN_AMP can be sampled via transistor MN_CASC which transfers charge to sampling capacitor CWELL according to control signal CACS. The sampling transistor MN_CASC and CWELL form a sample circuit such as previously described with respect to FIG. 2. A reset switch S5 can be provided to reset charge from the sampling capacitor CWELL according to the control reset signal RST.

Figure 5:
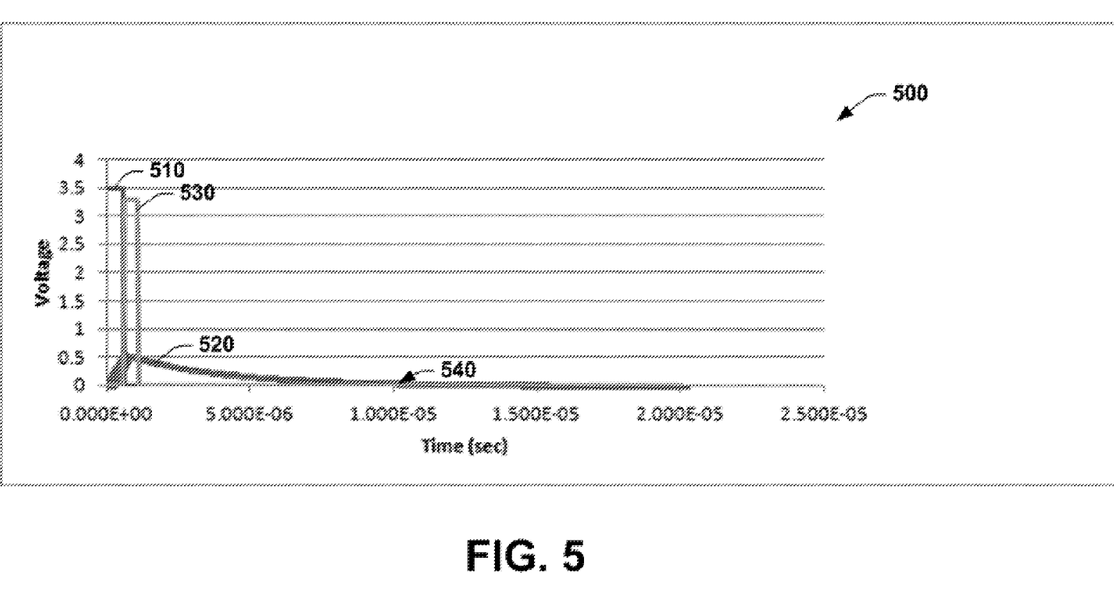
FIG. 5 illustrates an example pulse-bias voltage diagram for readout of a photodetector.

FIG. 5 illustrates an example pulse-bias voltage diagram 500 for readout of a photodetector. The diagram 500 shows excitation and sample voltages on the vertical axis versus time on the horizontal axis. An excitation pulse-bias voltage is applied 510 to a photodetector to produce decaying signal 520 from the photodetector where a sampling signal is shown at 530 to capture output from the photodetector in a rapid manner and before 1/F noise can accumulate on the detector. As shown, the waveform 520 from the photodetector decays according to a natural logarithmic pattern which is controlled in part by detector material lifetime as previously described. After the waveform has decayed below a predetermined threshold such as shown at 540 and representing a desired minimum current value in the detector, a subsequent excitation and sampling of the detector can be initiated. By waiting until detector current is below the desired threshold, 1/F noise can be reduced. As noted previously, in addition to (or instead of waiting), a voltage control can be provided to reduce the current below the threshold in an active manner (e.g., an electronic switch to discharge photodetector and input capacitor).

Figure 6:
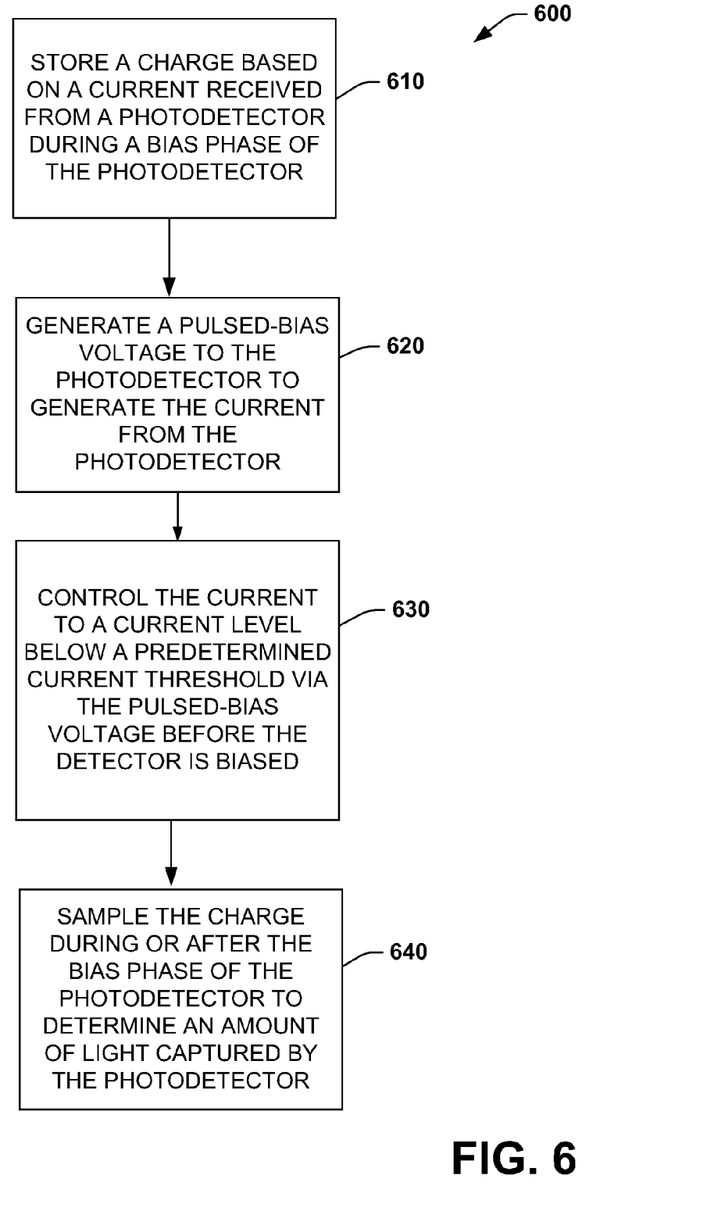
FIG. 6 illustrates an example method to mitigate 1/F noise during readout of a photodetector.

In view of the foregoing structural and functional features described above, an example method will be better appreciated with reference to FIG. 6. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an IC or a controller, for example.

FIG. 6 illustrates an example method 600 to mitigate 1/F noise during readout of a photodetector. At 610, the method 600 includes storing a charge based on a current received from a photodetector during a bias phase of the photodetector (e.g., via input capacitor 120 of FIG. 1). At 620, the method 600 includes generating a pulsed-bias voltage to the photodetector to generate the current from the photodetector e.g., via bias controller 140 of FIG. 1). At 630, the method 600 includes controlling the current to a current level below a predetermined current threshold via the pulsed-bias voltage before the photodetector is biased and a subsequent sampling of the stored charge on the input capacitor is initiated to mitigate 1/F noise in the photodetector (e.g., via bias controller 140 of FIG. 1). At 640, the method 600 includes sampling the charge during or after the bias phase of the photodetector to determine an amount of light captured by the photodetector (e.g., via sample and readout circuit 130 of FIG. 1). Although not shown, the method 600 can also include discharging the photodetector to a current level below the predetermined current threshold before the subsequent sampling of the stored charge on the input capacitor is initiated (e.g., via voltage control 170 of FIG. 1). The method 600 can also include controlling the timing of the photodetector pulse-bias voltage and subsequent sampling of the input capacitor such that the subsequent sampling is greater than a time parameter related to the lifetime of the photodetector (e.g., greater than about 10% of the lifetime).

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A circuit, comprising:
   an input capacitor that stores charge based on a current received from a photodetector during a bias phase on the photodetector, wherein the stored charge on the input capacitor is sampled during or after the bias phase to determine an amount of light captured by the photodetector induced by changes in detector resistance; and
   a bias controller that supplies a pulsed-bias voltage to the photodetector to generate the current from the photodetector, wherein the bias controller controls the current to a current level below a predetermined current threshold via the pulsed-bias voltage before the detector is biased and a subsequent sampling of the stored charge on the input capacitor is initiated to mitigate 1/F noise in the photodetector.

2. The circuit of claim 1, wherein the bias controller includes a timing control to control timing of the photodetector bias and subsequent sampling of the input capacitor such that the current level in the photodetector is held below the predetermined current threshold prior to biasing.

3. The circuit of claim 2, wherein the timing control controls the timing of the photodetector bias and subsequent sampling of the input capacitor such that the subsequent sampling is greater than a time parameter related to the lifetime of the photodetector.

4. The circuit of claim 3, wherein the time parameter is set to greater than 10 percent of the lifetime of the photodetector.

5. The circuit of claim 3, wherein the time parameter is set such that the current level from the photodetector drops below a threshold value at a predetermined time before the biasing of the photodetector and subsequent sampling of the stored charge on the input capacitor is initiated.

6. The circuit of claim 2, wherein the timing control includes a sampling control signal output to control timing of the subsequent sampling of the stored charge on the input capacitor.

7. The circuit of claim 6, further comprising an amplifier that amplifies the sampled voltage on the capacitor that is related to the charge on the input capacitor that is a function of light incident on the photodetector.

8. The circuit of claim 7, further comprising a readout circuit to determine the light intensity of the photodetector based on the sampled charge from a sample circuit.

9. The circuit of claim 1, further comprising a voltage control to discharge the photodetector and the input capacitor to a current level below the predetermined current threshold at a predetermined time before the subsequent sampling of the stored charge on the input capacitor is initiated.

10. A circuit, comprising:
    an input capacitor that stores charge based on a current received from a photodetector during a bias phase of the photodetector, wherein the stored charge on the input capacitor is sampled during or after the bias phase to determine an amount of light captured by the photodetector; and
    a bias controller that supplies a pulsed-bias voltage to the photodetector to generate current from the photodetector, wherein the bias controller controls the current to a current level below a predetermined current threshold at a predetermined time before biasing the detector via the pulsed-bias voltage before a subsequent sampling of the stored charge on the input capacitor is initiated to mitigate 1/F noise in the photodetector; and a timing control in the bias controller to control timing of the photodetector bias and subsequent sampling of the input capacitor such that the current level is below the predetermined threshold at a predetermined time before biasing the detector.

11. The circuit of claim 10, wherein the timing control controls the timing of the subsequent sampling of the input capacitor such that the subsequent sampling is greater than a time parameter related to the lifetime of the photodetector.

12. The circuit of claim 11, wherein the time parameter is set greater than ten percent of the lifetime of the photodetector.

13. The circuit of claim 11, wherein the time parameter is set such that the current level from the photodetector passes below a predetermined threshold level at a time before the biasing of the detector and subsequent sampling of the stored charge on the input capacitor is initiated.

14. The circuit of claim 11, wherein the timing control includes a sampling control signal output to control timing of the subsequent sampling of the stored charge on the input capacitor.

15. The circuit of claim 14, further comprising an amplifier that receives the stored charge from the input capacitor based on the sampling control signal output.

16. The circuit of claim 15, further comprising a sample circuit to sample the stored charge from the amplifier as a sampled charge during or after the bias phase of the photodetector.

17. The circuit of claim 10, further comprising a voltage control to discharge the photodetector and the input capacitor to control the photodetector current to a current level below the predetermined current threshold after the subsequent sampling of the stored charge on the input capacitor is completed.

18. A method, comprising:
storing a charge based on a current received from a photodetector during a bias phase of the photodetector;
generating, via a controller, a pulsed-bias voltage to the photodetector to generate the current from the photodetector;
controlling the current, via the controller, to a current level below a predetermined current threshold via the pulsed-bias voltage before the detector is biased and a subsequent sampling of the stored charge on the input capacitor is initiated to mitigate 1/F noise in the photodetector; and
sampling the charge during or after the bias phase of the photodetector to determine an amount of light captured by the photodetector.

19. The method of claim 18, further comprising discharging the photodetector to a current level below the predetermined current threshold after the subsequent sampling of the stored charge on the input capacitor is completed.

20. The circuit of claim 19, further comprising controlling the timing of the photodetector pulse-bias voltage and subsequent sampling of the input capacitor such that the subsequent sampling is greater than a time parameter related to the lifetime of the photodetector.

* * * * *